May 11, 1926.

S. S. GRIFFIN

STEERING SLEIGH

Filed Feb. 16, 1925

1,584,530

INVENTOR.
Sidney S. Griffin
BY
Geo. F. Kimmel ATTORNEY.

Patented May 11, 1926.

1,584,530

UNITED STATES PATENT OFFICE.

SIDNEY S. GRIFFIN, OF DETROIT, MICHIGAN.

STEERING SLEIGH.

Application filed February 16, 1925. Serial No. 9,594.

This invention relates to the class of toys and pertains particularly to the class of steering sleighs.

The primary object of this invention is the provision, in a manner as hereinafter set forth, of a sleigh having an improved guide or steering mechanism adapted to be controlled by one occupying the sleigh.

Another object of the invention is the provision, in the manner hereinafter set forth, of a sleigh having a steering mechanism located beneath the forward end thereof and having means associated therewith and extending beyond each side thereof, whereby the sleigh can be guided by the feet of the rider when sitting upright on the sleigh, or by the hands when the rider is lying upon the sleigh.

Still another object of the invention is the provision, in a manner hereinafter set forth, of a sleigh having a front and rear set of runner elements removably secured in position to facilitate the easy replacement of any one of the same.

The final object of the invention is the provision, in the manner hereinafter set forth, of a steering sleigh of unique structure, strong and durable, attractive in appearance and inexpensive to manufacture.

The invention will be best understood from a consideration of the following detailed description taken in connection with the accompanying drawing, forming a part of this specification, with the understanding that the invention is not confined to any strict conformity with the showing of the drawing, but may be changed and modified so long as such changes and modifications mark no material departure from the salient features of the invention as expressed in the appended claim.

In the drawings:—

Figure 1:
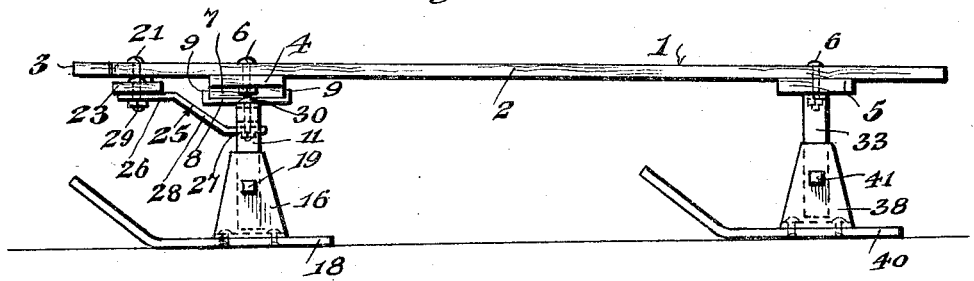
Fig. 1, is a side elevation of the device embodying this invention.
Figure 2:
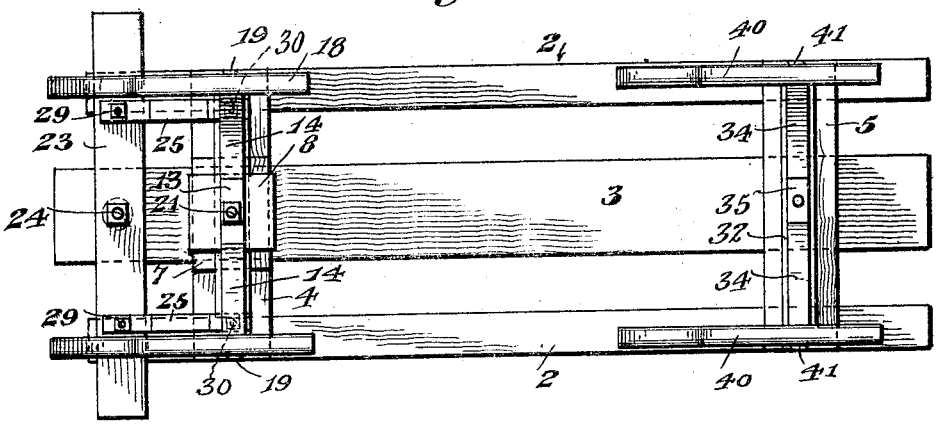
Fig. 2, is a bottom plan view of the same.
Figure 3:
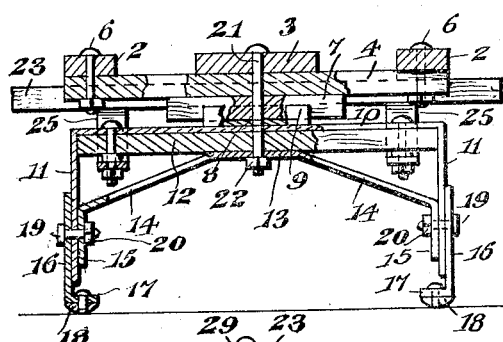
Fig. 3, is a transverse section taken through the body rearwardly of the forward runners and looking toward the same, with portions of the front truck shown in section.
Figure 4:
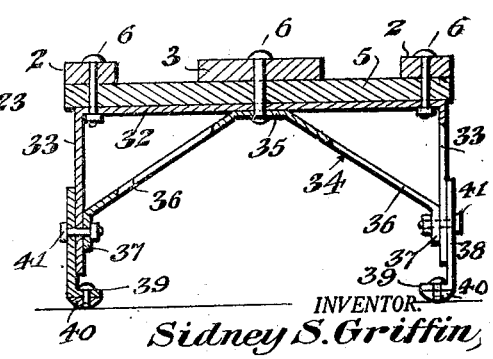
Fig. 4, is a transverse section taken through the rear truck and runners.
Figure 5:
Fig. 5, is a detailed view partially in section, of a portion of the steering mechanism.

Referring now to the drawing in detail wherein like numerals of reference indicate corresponding parts throughout the several views, the device embodying this invention has a platform indicated generally by the numeral 1. This platform is here shown as formed of a series of spaced slats 2 and 3, the slats 2 being upon the outside and forming or constituting side rails and the slats 3 being located between the outer rails 2 and spaced from and parallel therewith. Although the platform 1 is, as described, of slats, is to be understood that the same may be formed solid if desired.

Extending transversely of the underside of the platform 1 is a pair of bolsters 4 and 5 respectively, the bolster 4 being located rearwardly of the forward end of the platform, and the bolster 5 being located inwardly of the rear of the platform. Bolts 6 are passed through the slats 2 and 3 and through the bolsters 4 and 5 as shown to secure the same in position.

The forward bolster 4 has upon the central portion of its lower face a bolster block 7 and over the under face of this block 7 there is positioned a wear plate 8, the front and rear edges of which are turned upwardly as at 9, to engage the front and rear faces of the bolster 7 to secure the plate in proper position.

A front runner truck is provided constituting an inverted substantially U-shaped frame comprising a horizontal transverse portion 10 which extends beneath and normally parallel with the bolster 4 and the down turned side legs 11. Pressed against and extending throughout the under face of the transversed portion 10 is a reinforcing bar 12, and engaging the central portion of the under face of this bar 12 is a brace member comprising a horizontal central portion 13 merging at its ends with outwardly and downwardly extending arms 14, which arms terminate in the downwardly extending end portions 15. Each of these end portions 15 bears against the inner face of one of the down turned leg members 11. Each of the leg members bears against one face of a substantially triangular shaped plate 16, the lower edge and base of which is turned to provide a foot 17, and each foot is riveted or otherwise secured to a runner member 18. A securing bolt 19 is passed through each of the plates 16, the adjacent leg 11 and the portion 15 of the inner brace member which bears against the inner face of the leg and is retained in position, and retains these three members in proper relation, by means of the nut 20 upon the inner end.

A king bolt 21 is passed through the central slat 3 of the platform and the bolster 4 there beneath and through the front runner truck and is secured in position by the nut 22 which bears against the under face of the portion 13 of the brace member.

Pivotally secured against the under face of the platform 1 upon the longitudinal center thereof, is a steering bar 23 retained in position by the central pivot bolt 21. This steering bar, as shown, is located forwardly of the bolster 4 and has the ends thereof extending beyond the side of the platform. A pair of steering links 25 are pivotally connected to this steering bar as clearly shown in Figure 1, and each of these links 25 consist of a pair of horizontal parallel end portions 26 and 27 respectively and a rearwardly and downwardly extending or obliquely inclined central portion 28.

The portion 26 of each of the steering links is pivotally secured to the steering bar 23 by means of the bolt 29 and the other portion 27 of each link engaging the under face of the brace bar 12 and pivotally secured thereto by the means of the through bolt 30. These link members 25 are, as shown, positioned one adjacent each leg 11 and runner 18. Wear washers 31 are interposed between the portions 26 and 27 of the links and the members to which these portions are secured.

A rear truck is provided which constitutes an inverted substantially U-shaped frame comprising a horizontal transverse portion 32 which is secured against the under face of the bolster 5 and held there against by means of the securing bolt 6, and the depending leg members 33, extending from each edge of the transverse portion 32. A brace member, indicated generally by the numeral 34 constitutes a portion of this inner truck and comprises a horizontal central portion 35 which bears against the under face of the transverse portion 22 and merges at its ends with the outwardly and downwardly inclined brace arms 36, which arms terminate in the downwardly extending portions 37 which bear against the inner face of an adjacent leg 33. A substantially triangular plate member 38 is positioned against the outer face of each leg 33 and each of these members has its lower edge or base portion angled inwardly as at 39 to provide the foot to each of which is attached by rivets or other appropriate securing means a runner member 40. The plate members 38, are as shown, of the same construction as the plate members 16 associated with the front runners. Bolts 41 serve to secure the plates 38, the legs 33 and the depending portions 37 in a unitary structure.

In the construction shown the runner members are each independently replaceable quickly and conveniently as the single bolt which extends through the plate member carried by each runner is easily and quickly removed for the application of a new runner. This construction is also advantageous in that the runners are each pivotally connected to its respective truck so that a swinging movement of each runner can be had longitudinally of the sleigh, which movement will insure easier riding of the sleigh over uneven ground, than would be the case if the sleigh were provided with rigid runners.

An improved and more positive steering of the sleigh is assured through the use of a steering mechanism of the type herein disclosed for the front pivoted truck is acted upon at points adjacent each end simultaneously when the steering bar 23 is swung upon its pivot 24. From the foregoing description it will be readily seen that an improved steering sleigh construction is obtained, which will steer with greater ease and accuracy than steering sleighs at present in use.

Having thus described my invention, what I claim is:—

In a sleigh of the character described including a platform, a front and rear truck beneath and supporting said platform, said trucks comprising an inverted substantially U-shaped frame, a brace element secured to the central portion of the yoke of said frame and having each end abutting the inner face of the legs of the frame, a substantially triangular plate member positioned against the outer face of each leg of each frame, a bolt extending through each plate and the adjacent leg and brace element end and pivotally securing the plate thereto, the lower edge of each plate being inturned to set up a foot, and a runner member secured against the underside of each foot and designed to oscillate longitudinally of the sleigh with the plate.

In testimony whereof, I affix my signature hereto.

SIDNEY S. GRIFFIN.